US011135637B2

(12) United States Patent
Draht et al.

(10) Patent No.: US 11,135,637 B2
(45) Date of Patent: Oct. 5, 2021

(54) METHOD FOR DETERMINING THE QUALITY OF A JOINT, AND CONTROL METHOD FOR A PROCESS OF JOINING A PLURALITY OF METAL SHEETS BY MEANS OF A JOINING DEVICE

(71) Applicant: BÖLLHOFF VERBINDUNGSTECHNIK GmbH, Bielefeld (DE)

(72) Inventors: Torsten Draht, Schloß Holte-Stukenbrock (DE); Stefan Rehling, Bückeburg (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 311 days.

(21) Appl. No.: 16/062,728

(22) PCT Filed: Nov. 30, 2016

(86) PCT No.: PCT/EP2016/079332
§ 371 (c)(1),
(2) Date: Jun. 15, 2018

(87) PCT Pub. No.: WO2017/102335
PCT Pub. Date: Jun. 22, 2017

(65) Prior Publication Data
US 2019/0001392 A1 Jan. 3, 2019

(30) Foreign Application Priority Data
Dec. 18, 2015 (DE) .................... DE102015122255.8

(51) Int. Cl.
B21D 39/03 (2006.01)
B21J 15/02 (2006.01)
(Continued)

(52) U.S. Cl.
CPC .......... *B21D 39/031* (2013.01); *B21J 15/025* (2013.01); *B21J 15/285* (2013.01); *F16B 5/04* (2013.01)

(58) Field of Classification Search
CPC ..... B21D 39/031; B21J 15/025; B21J 15/285; F16B 5/04
See application file for complete search history.

(56) References Cited

U.S. PATENT DOCUMENTS 4,365,401 A 12/1982 Ogren
6,862,793 B2 3/2005 Frenken
(Continued)

FOREIGN PATENT DOCUMENTS

CN 201030479 Y 3/2008
CN 203448963 U 2/2014
(Continued)

OTHER PUBLICATIONS

English translation of the International Preliminary Report on Patentability for PCT/EP2016/079332 dated Jun. 19, 2018, (6 pages).
(Continued)

*Primary Examiner* — Moshe Wilensky
*Assistant Examiner* — Kyle A Cook
(74) *Attorney, Agent, or Firm* — Reising Ethington P.C.; Matthew J. Schmidt

(57) ABSTRACT

A method for determining the quality of a joint fabricated in a plurality of metal sheets by a joining device and a control method. The joining device comprises a drive element, and a hold-down device The method may have the following steps: moving the drive element to move the punch and, via at least one first and one second spring, the hold-down device; recording of a force applied by the drive element with a first sensor and of a distance covered by the drive
(Continued)

Figure 1A:
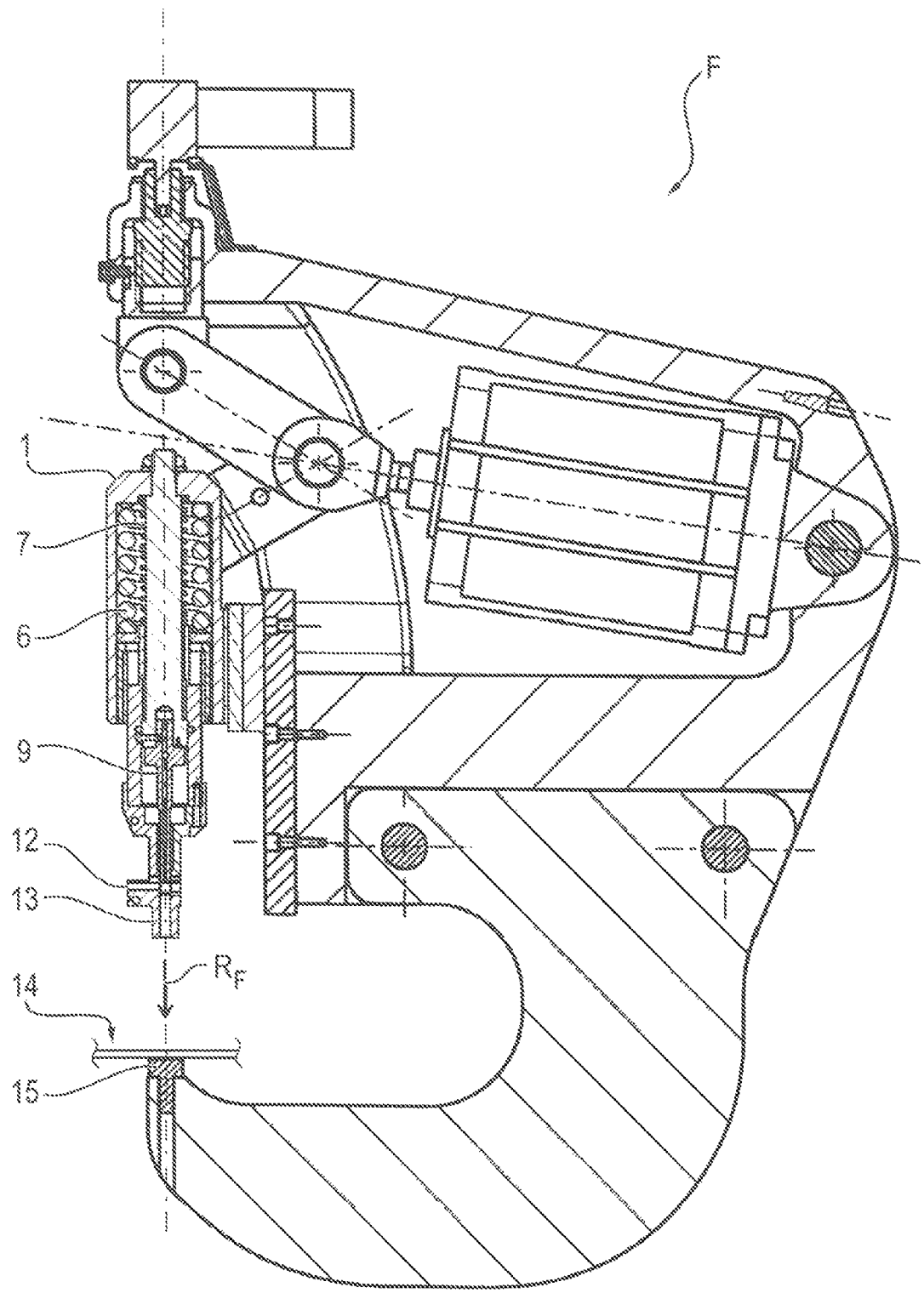

element with a second sensor during a movement of the drive element in a mating direction and opposite thereto as a force/displacement curve; and comparing a linear relief range in the recorded curve with a reference curve.

12 Claims, 7 Drawing Sheets

(51) Int. Cl.
*B21J 15/28* (2006.01)
*F16B 5/04* (2006.01)

(56) References Cited

U.S. PATENT DOCUMENTS

| | | | |
|---|---|---|---|
| 7,409,760 B2 | 8/2008 | Mauer et al. | |
| 7,797,126 B2 | 9/2010 | Wenzel et al. | |
| 9,089,892 B2 | 7/2015 | Bloecher | |
| 2001/0027597 A1* | 10/2001 | Mauer | B21J 15/28 |
| | | | 29/407.04 |
| 2002/0092145 A1* | 7/2002 | Blocher | B21J 15/025 |
| | | | 29/407.05 |
| 2008/0177512 A1* | 7/2008 | Wenzel | B21J 15/285 |
| | | | 703/1 |
| 2014/0173869 A1* | 6/2014 | Bloecher | B21J 15/285 |
| | | | 29/407.01 |

FOREIGN PATENT DOCUMENTS

| | | |
|---|---|---|
| CN | 104647002 A | 5/2015 |
| CN | 104827661 A | 8/2015 |
| DE | 10031073 A1 | 1/2002 |
| DE | 10101724 A1 | 7/2002 |
| DE | 102004015568 A1 | 10/2005 |
| DE | 10021781 B4 | 2/2007 |
| DE | 102010027195 A1 | 1/2012 |
| DE | 102012025047 A1 | 6/2014 |
| EP | 0893179 B1 | 10/2000 |
| EP | 1294505 B1 | 8/2005 |
| EP | 1946864 A1 | 7/2008 |
| JP | 2007203307 A | 8/2007 |
| JP | 4885552 B2 | 2/2012 |
| WO | WO2014025608 A1 | 2/2014 |

OTHER PUBLICATIONS

CN Office Action for CN Application No. 201680074345.9 dated Apr. 29, 2019 (6 pages).
Written Opinion & International Search Report for PCT/EP2016/079332 dated Feb. 2, 2017, 11 pages.

* cited by examiner

METHOD FOR DETERMINING THE QUALITY OF A JOINT, AND CONTROL METHOD FOR A PROCESS OF JOINING A PLURALITY OF METAL SHEETS BY MEANS OF A JOINING DEVICE

1. TECHNICAL FIELD

The present disclosure concerns a method for determining the quality of a joint fabricated in a plurality of metal sheets by means of a joining device. Joints of this type are, for example, riveted joints or clinch joints, the corresponding joining devices for which are known. The present furthermore concerns a control method for joining a plurality of metal sheets by means of the joining device, which are named above as examples.

2. BACKGROUND

The fabrication of joints, for example by placing a punch rivet into a plurality of metal sheets or by pressing a punch without a joining element into a plurality of metal sheets is generally known. Drive elements are used to implement such joints, said elements being powered and thus moved by means of hydraulic systems, electromechanical systems, pneumatic systems or the like. Various methods can be applied for control and monitoring of joining processes of this kind.

For example, DE 10 2012 025 047 A1 describes a method for monitoring a mechanical joining process, in particular a punch rivet or clinch process. For this purpose, a punch and a hold-down device are arranged in a movable manner inside a framework of a joining device. The hold-down device is coupled to the punch and pretensioned in the mating direction of the punch. The framework further comprises a die in the direction of which—the mating direction—the punch is moved. To monitor the joining process, the punch force exerted by the punch and the relative path of the punch with reference to the hold-down device are recorded in order to be able to trace and display a joining curve in the form of the punch force as a function of the relative path. Thus for monitoring the joining process, two travel sensors/path sensors for the punch and the hold-down device and one force sensor are required as minimum equipment. These must be designed as an integrated part of the compact setting head and furthermore be read via a data recording system, with their data being presented in a form which can be evaluated. Precisely this integration of the three minimum sensors is challenging in terms of design and cannot always be reconcilable with the available space in the setting head or with the requirements profile of the punch machine.

Moreover, the prior art in WO 2014/025608 A1 discloses a joining device in which the evaluation is implemented without the use of recording of the punch force. This regulation of the punch machine is based on recording the relative position of the punch and the hold-down device with a reference to one another. Depending on this relative position with respect to one another it can be assessed whether a riveted joint has been fabricated satisfactorily. The hold-down device comprises a travel sensor/path sensor for this purpose, said sensor recording the position of the punch relative to the hold-down device and relaying this for evaluation.

U.S. Pat. No. 7,409,760 B2 describes an electric motor-driven punch machine in which an electric motor moves a punch via a gear mechanism to fabricate a joint. To implement real-time control of the joining process, at least one first sensor is used which records an electric operating parameter of the electric drive of the punch machine. Such an operating parameter is, for example, the torque of the electric motor or its motor current or even its speed. In addition to that, a characteristic parameter for the punching process is determined by means of at least one second sensor. These characteristic parameters include the aforementioned parameters for characterizing a joint, such as the punching force, a punch position, the rivet size or even the thickness of the workpiece. The parameters recorded by means of the sensors are evaluated and selectively modified in real-time as part of a closed-loop control in order to achieve optimal joining. The design and modus operandi described here require great effort for data recording and processing. This is because the joint parameters such as the force of the punch and a control parameter of the punch such as the motor current must be compared in real-time in order to be able to regulate the joining process for an optimal joint in fact. Even if this real-time control appears to be justified by exacting quality requirements for the joint, it is frequently not reconcilable with economic limitations of a punch machine to be provided.

According to EP 1 946 864 A1, it is determined from a determined force/displacement curve of a punch machine whether, for example, the desired rivet head end position has been achieved in a punch riveting process or the desired remaining bottom thickness in a clinch process. The basis of these control and evaluation methods is constituted by the interpretation of the force/displacement curve, which is recorded by means of a force sensor for the punch force and a travel sensor/path sensor for the distance covered by the punch. It can be seen from this force/displacement curve when, for example, the punch presses the punch rivet against an upper sheet metal position so that the punching process can begin. However, the control and evaluation disclosed here is based on the length of the placed rivet being known. But not every setting head allows the length of the joining element used to be determined, so the use of the control and evaluation method described here is limited.

Therefore it is an object of at least some embodiments of the present invention to provide a method for determining the quality of a joint and a control method for a punch machine, which has a sufficiently simple structural design but at the same time permits satisfactory fabrication and evaluation of joints.

3. SUMMARY

The aforementioned object is solved in at least some embodiments by a method for determining the quality of a joint and by a control method for joining a plurality of metal sheets by means of a joining device. Advantageous embodiments and modifications may be derived from the dependent claims, the description below and the appended drawings.

The method for determining the quality of a joint which is fabricated in a plurality of metal sheets by means of a joining device, said device having a drive element in combination with a punch which can be moved by said element and with a hold-down device which can be moved with it, comprises the following steps: moving the drive element in a mating direction, with the drive element transferring the movement to the punch and, via at least one first and one second spring, to the hold-down device; sensing of a force applied by the drive element with a first sensor and of a distance covered by the drive element with a second sensor during a movement of the drive element in a mating direction and opposite thereto as a force/displacement curve; and after the completion of a joining process, comparing a linear relief range in the recorded force/displacement curve with a reference curve of the joining device, which can be determined as a reference force/displacement curve while moving the punch and the hold-down device by means of the drive element toward and away from a counter-support without metal sheets arranged between and without a joining element, wherein the comparison ensures an evaluation of a head end position of a joining element or a remaining bottom thickness in the plurality of metal sheets.

The method for determining the quality of a joint is based on the comparison of a currently recorded joining curve, i.e. of a force/displacement curve of the joining device. This force/displacement curve is determined based on the movement of the drive element, since the force applied by the drive element and the distance covered by the drive element are sensed by means of corresponding sensors. Based on this force/displacement curve specific to the respective joining process, one can derive conclusions with regard to the thickness of the metal sheets to be joined with each other, the placement/contact of the hold-down device on the plurality of metal sheets, the placement/contact of the rivet on the plurality of metal sheets and therefore, by comparing to a reference curve of the joining device, characteristic data such as the thickness of the plurality of metal sheets and the length of the rivet used. For this purpose, the reference force/displacement curve of the joining device is stored in the memory of a controller for controlling the joining device. If the characterizing force/displacement curve of this joining process is sensed/recorded during a current joining process based on the sensed force/displacement data, then afterward the quality of the joint and thus of the joining process can be evaluated by comparing the current force/displacement curve with the reference force/displacement curve. This comparison also includes evaluative calculations being able to be performed based on the current force/displacement curve and the reference force/displacement curve; these calculations enable an assessment of the joint.

In advance of fabricating the joint, the fabrication of a joint is simulated to determine the reference force/displacement curve. That means that the punch and the hold-down device are moved against a counter-support by means of the drive element without a plurality of metal sheets and a joining element, such as a punch rivet or a suitable punch for clinching, being located between the punch and the die. The counter-support is generally the designation for the structural part of the device which supports the metal sheets or components and via the metal sheets/components delivers a sufficient counterforce to the punch and/or the hold-down device to fabricate the joint. The counter-support for fabricating a riveted joint and a clinch joint is a die. For determining the reference force/displacement curve, the counter-support is an anvil. During this process, the force applied by the drive element and the distance covered by the drive element are recorded in order to be able to create a reference force/displacement curve based on these. This reference force/displacement curve provides characteristic data for the elastically deformable components such as preferably holding springs and C-frames, and for the joining device, this data being changed due to the later use of a plurality of metal sheets between the punch and the counter-support as well as of a punch rivet of a particular length. Correspondingly, by the comparison of the reference force/displacement curve and the current force/displacement curve these characteristic data, for example the thickness of the plurality of metal sheets and the length of the punch rivet, can then be derived from a corresponding comparison and used for evaluating the quality of the joining process.

According to an embodiment of the present method, in comparing to a reference relief range of the reference force/displacement curve, with a match the linear relief range will identify a specified head end position of a punch rivet, in particular a flush head end position of a semi-hollow or solid punch rivet, or a defined head end position of a semi-hollow or solid punch rivet with head contact when placing/penetrating a punch rivet into the plurality of metal sheets, or a specified remaining bottom thickness in a clinch process. Correspondingly, an arrangement of the linear relief range displaced toward smaller displacement values compared to the reference relief range identifies a larger head projection than specified with reference to the plurality of metal sheets or a greater remaining bottom thickness than predefined in a clinch process, while an arrangement of the linear relief range displaced toward larger displacement values compared to the reference relief range identifies a joining element pressed too deeply into the plurality of metal sheets or a remaining bottom thickness smaller than predefined in a clinch process.

If one observes a joining device with a C-frame, then during the joining process and particularly toward the end of the joining process the C-frame is bent up until the punch rivet is placed completely or a clinch joint is fabricated. After the joining process has been concluded by fabrication of a joint, the drive element is moved back to its initial position. Here the force/displacement curve shows a linear relief range in the current force/displacement curve as well as in the reference force/displacement curve. This linear relief range characterizes the elastic return movement of the C-frame to its initial shape. With an optimally fabricated riveted joint or an optimal clinch process respectively, this relief range ends at an actuated specified force setpoint value for which the fabrication of an optimal joint is expected. If an optimal joint is present, the linear relief range would run within a preferred tolerance range in the reference relief range. If, however, a correction, in particular an offset of the reference relief range to be made parallel to the displacement axis (see below), should indicate that the specified force setpoint value was not optimally matched for the joint to be fabricated, then the linear relief range of the current force/displacement curve runs laterally displaced with respect to the linear reference relief range. With an offset toward smaller displacement values, this means a punch rivet which is not placed deeply enough or, in a clinch process, too large a remaining bottom thickness. With an offset toward larger displacement values, this signals a punch rivet which is placed to deeply or, in a clinch process, too little remaining bottom thickness.

According to a further embodiment of the present disclosure, a linear relief range in the force/displacement curve extrapolated up to an intersection point SP with the displacement axis at a force equal to zero or a straight line to a defined force value identifies a flush or specified head end position of a punch rivet with a penetration of a punch rivet into the plurality of metal sheets or a specified remaining bottom thickness in a clinch process if the intersection point SP matches a reference intersection point R of the linear reference relief range extrapolated to the displacement axis or to the straight line for a defined force value. In the same way, a deviation of the intersection point SP from the reference intersection point R toward smaller displacement values represents a greater head projection then specified with reference to the plurality of metal sheets or a greater remaining bottom thickness than specified in a clinch process, while a deviation of the intersection point SP from the reference intersection point R displaced toward larger displacement values indicates a joining element pressed to deeply into the plurality of metal sheets or a remaining bottom thickness smaller than specified in a clinch process.

The above description of the comparison of the linear relief range with the linear reference relief range is also applicable in the same manner to the interpretation of the comparison of the intersection points from the extrapolated linear relief range and the extrapolated reference relief range.

According to a further embodiment of the present method, in which the reference force/displacement curve represents a deformation of the first spring of the hold-down device and a deformation of the second spring of the hold-down device in a first linear increase range separated via a step and in a second linear increase range, the further step is provided of generating a difference of the displacement value $W_{RS,\,0}$ of the step in the reference force/displacement curve and the displacement value $W_{ES,\,0}$ of the step in the recorded force/displacement curve, which represents a thickness of the plurality of metal sheets to be joined.

As the definition above shows, the thickness of the plurality of metal sheets to be joined to one another can be derived from the comparison of the current force/displacement curve with the reference force/displacement curve. This is preferably due to the design features of the joining device, the hold-down device of which can be pre-tensioned in the mating direction by two springs with different spring constants. If the hold-down device is pressed against a plurality of metal sheets due to the preferred movement of the drive element, the first spring of the hold-down device will be compressed first and the second spring of the hold-down device thereafter. This results in characteristic linear sections in the force/displacement curve, the respective slopes of which depend on the spring constants of the respective springs of the hold-down device. If the transition range between the compression of the first spring of the hold-down device and the compression of the second spring of the hold-down device shows an offset in the current force/displacement curve compared to the reference force/displacement curve due to the step linking them, then this offset corresponds to the thickness of the plurality of metal sheets to be joined to one another, which are situated between the punch and the counter-support.

According to a further embodiment, the method comprises the further step of generating a difference between an initial displacement value $S_0$ of a non-linear increase range bordering on a second linear increase range and a starting displacement value $S_{02}$ of the bordering second linear increase range, which represents a length of the joining element.

With regard to the reference force/displacement curve it can be seen that, after passing through the first linear increase range for the first spring of the hold-down device and through the second linear increase range for the second spring of the hold down device, the reference force/displacement curve transitions to a third linear increase range with greater slope compared to the first and second increase range. This third linear increase range represents an elastic deformation, specifically the C-frame of the joining device bending open elastically. In comparison with the reference force/displacement curve, in the current force/displacement curve the second linear increase range transitions to a non-linear increase range. This non-linear increase range represents the pressing/penetrating of the punch rivet or joining element or in general a punch in the clinch process into the plurality of metal sheets. Therefore the distance between the beginning of the second linear increase range in the force/displacement curve and the beginning of the non-linear increase range represents a parameter proportional to the length of the joining element used. To calibrate this determined length to the actual length of the joining element it is preferred to take a constant typical for a setting head into account. This constant describes a free path of the punch within the hold-down device just before placement on the metal sheets after the hold-down device has applied its retaining force, which can be generated for holding the metal sheets, to the metal sheets. This free path is calibrated to the lengths of the punch in a clinch process and to the length of the punch with a punch rivet pre-loaded in the mating direction in a punching process for a solid punch rivet or semi-hollow punch rivet. Therefore the length of the joining element may result from the difference of the constant and the distance between the beginning of the second linear increase range in the force/displacement curve and the beginning of the non-linear increase range. Depending on the setting head used or the joining device used respectively, this constant can vary.

Furthermore, the present method comprise the further steps of comparing the determined length of the joining element with saved rivet lengths and signaling a misaligned rivet or a non-specified rivet or joining element if the determined length of the joining element is shorter than that of the minimum rivet length stored or it is longer than the maximum rivet length. In the memory area of the microcontroller controlling the joining device, various rivet lengths are stored which represent the joining elements which it is possible to use. Since it is possible, precisely with punch rivets having a shaft length shorter than the diameter of the rivet head, for the rivets to misalign in the joining channel, then the aforementioned distance for determining the rivet length signals whether a properly aligned punch rivet or a misaligned punch rivet is located in the joining channel. This is because the length of the joining element which is determined indirectly here must correspond to one of the correspondingly stored lengths of the joining elements. Moreover, particularly with the use of different lengths of joining elements from a magazine or in a workflow, it can happen that a joining element which is not specified for the joining task or which is unsuitable gets loaded into the setting head. In this case the method for quality determination or monitoring identifies the unsuitable joining element and generates a corresponding signal. This signal, be it electronic, visual and/or acoustic, is preferably used in the control method described below for the joining device in order to make a decision on the continuation or the cessation of the joining process. In this case, the signal is preferably an internal signal in the controlling microcontroller.

The present disclosure describes a control method for joining a plurality of metal sheets by means of a joining device, said device comprising a drive element in combination with a punch which can be moved with it and a hold-down device which can be moved with it. This control method has the following steps: specifying a maximum joining force via a force setpoint value $F_{soll}$, recording of a force applied by the drive element with a first sensor and of a distance covered by the drive element with a second sensor during a movement of the drive element in a mating direction and opposite thereto as a force/displacement curve, moving the drive element in a mating direction, with the drive element transferring the movement to the punch and, via at least one first and one second spring, to the hold-down device until the force setpoint value $F_{soll}$ is reached, and after that moving the drive element into an initial position, offsetting the force setpoint value $F_{soll}$ by at least one correction value K after comparing a linear relief range in the recorded force/displacement curve with a reference curve of the joining device, which can be determined as a reference force/displacement curve with the movement of the punch and the hold-down device via the drive element toward and away from a counter-support without metal sheets arranged between and without a joining element, in order to achieve in a subsequent joining process a specified head end position in a joining process of a punch rivet or a specified remaining bottom thickness in a clinch process.

The control method is constituted analogously to the method for determining the quality of a joint described above. Therefore the interpretations of the various process steps already discussed above are applicable to the control method described here.

According to the disclosure, the control method also has the following steps: maintaining the force setpoint value $F_{soll}$ if the linear relief range matches the reference relief range, increasing the force setpoint value $F_{soll}$ by the at least one correction value K if the linear relief range is displaced toward smaller displacement values compared to the reference relief range, and reducing the force setpoint value $F_{soll}$ by the at least one correction value K if the linear relief range is displaced toward larger displacement values compared to the reference relief range.

According to a further embodiment, the present control method includes the further steps of maintaining the force setpoint value $F_{soll}$ if a linear relief range in the force/displacement curve extrapolated up to an intersection point SP with the displacement axis or to a straight line at a defined force value represents the flush or specified head end position respectively or the predefined remaining bottom thickness if the intersection point SP matches a reference intersection point R of the linear reference relief range extrapolated up to the displacement axis or to the straight line at a defined force value, increasing the force setpoint value $F_{soll}$ by the at least one correction value if a deviation of the intersection point SP from the reference intersection point R toward smaller displacement values indicates a greater head projection than specified or a larger remaining bottom thickness than specified in a clinch process, and reducing the force setpoint value $F_{soll}$ by the at least one correction value if a deviation of the intersection point SP from the reference intersection point R toward larger displacement values indicates a head of the punch rivet pressed too deeply into the plurality of metal sheets or a remaining bottom thickness smaller than specified in a clinch process.

According to a further embodiment of the control method, in which the reference force/displacement curve represents a deformation of the first spring of the hold-down device and a deformation of the second spring of the hold-down device in a first linear increase range separated via a step and in a second linear increase range, the following further steps are provided: generating a difference of the displacement value $W_{RS,0}$ of the step in the reference force/displacement curve and the displacement value $W_{ES,0}$ of the step in the recorded force/displacement curve, which represents a thickness of the plurality of metal sheets to be joined, and offsetting the force setpoint value $F_{soll}$ to a corrected force setpoint value $F_{soll,k}$ as a function of the thickness determined for the plurality of metal sheets to be joined.

According to a further embodiment of the present control method, the following further steps are provided: generating a difference between an initial displacement value $S_0$ of a non-linear increase range bordering on a second linear increase range and a starting displacement value $S_{02}$ of the bordering second linear increase range, which represents a length of the joining element, and comparing the determined length of the joining element with saved rivet lengths and aborting the joining process if the determined length of the joining element is shorter than that of the minimum rivet length stored or it is longer than the maximum rivet length. As already described above in reference to the method for quality monitoring, which may form the basis of the control method, it is seen with the aforementioned comparison whether there is a misaligned rivet or a non-specified rivet for the present joining task in the punch channel or whether the suitable rivet is located in the punch channel. If the suitable rivet is not located in the punch channel, the joining process is aborted. Since the aforementioned comparison and thus also the corresponding decision on continuation or cessation of the joining process is preferably made by the microcontroller before the joining element is set into the metal sheets—i.e. just before or right at the beginning of the non-linear section of the force/displacement curve—the joining process can be aborted. In this case, the joining device preferably distances itself from the metal sheets in order to remove the out-of-specification rivet or to remove the misaligned rivet from the joining channel. As soon as this occurs, a new joining process is started with the aid of the preferred control method.

4. BRIEF DESCRIPTION OF THE ACCOMPANYING DRAWINGS

Figure 1B:
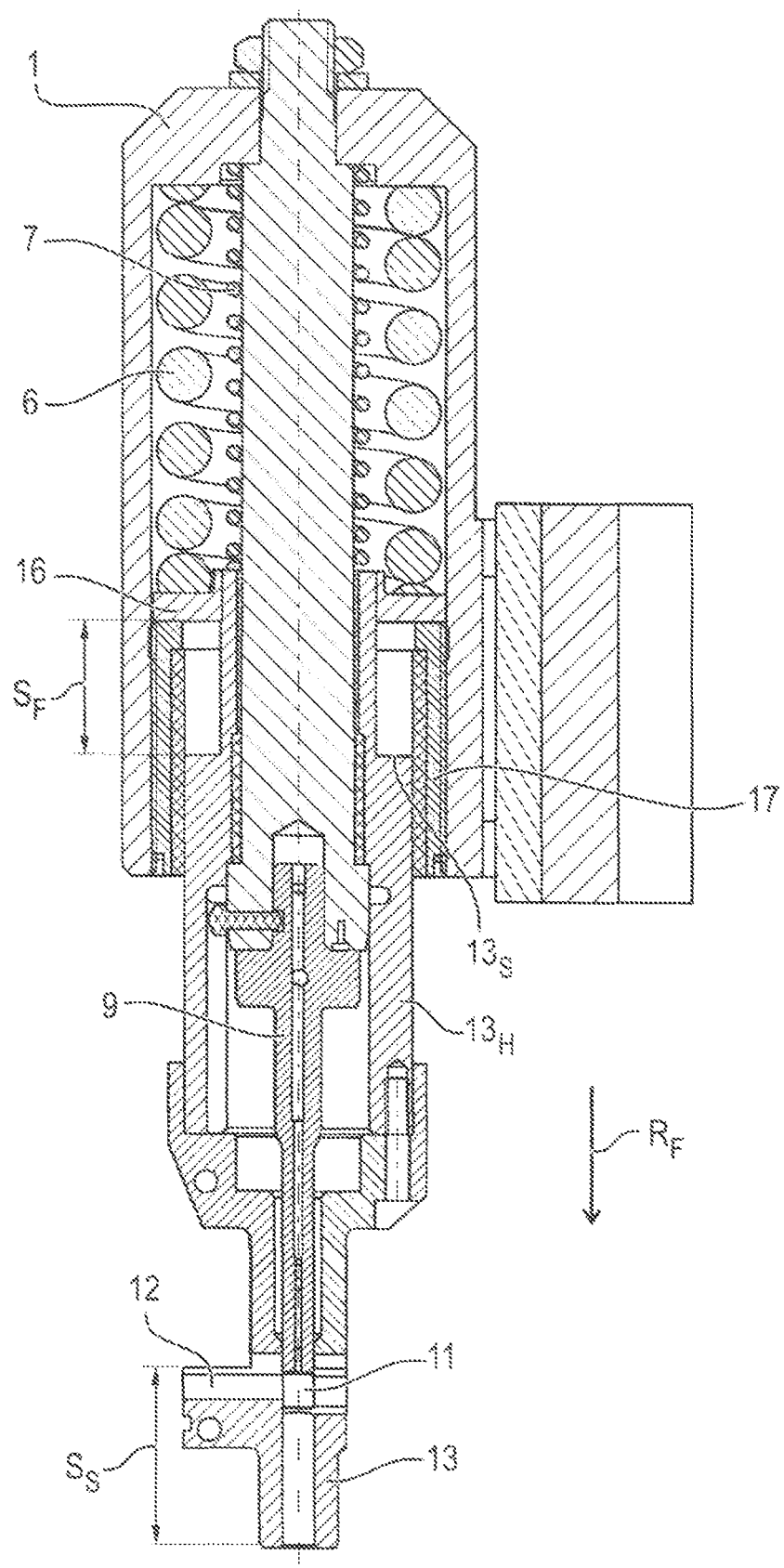
Figure 2:
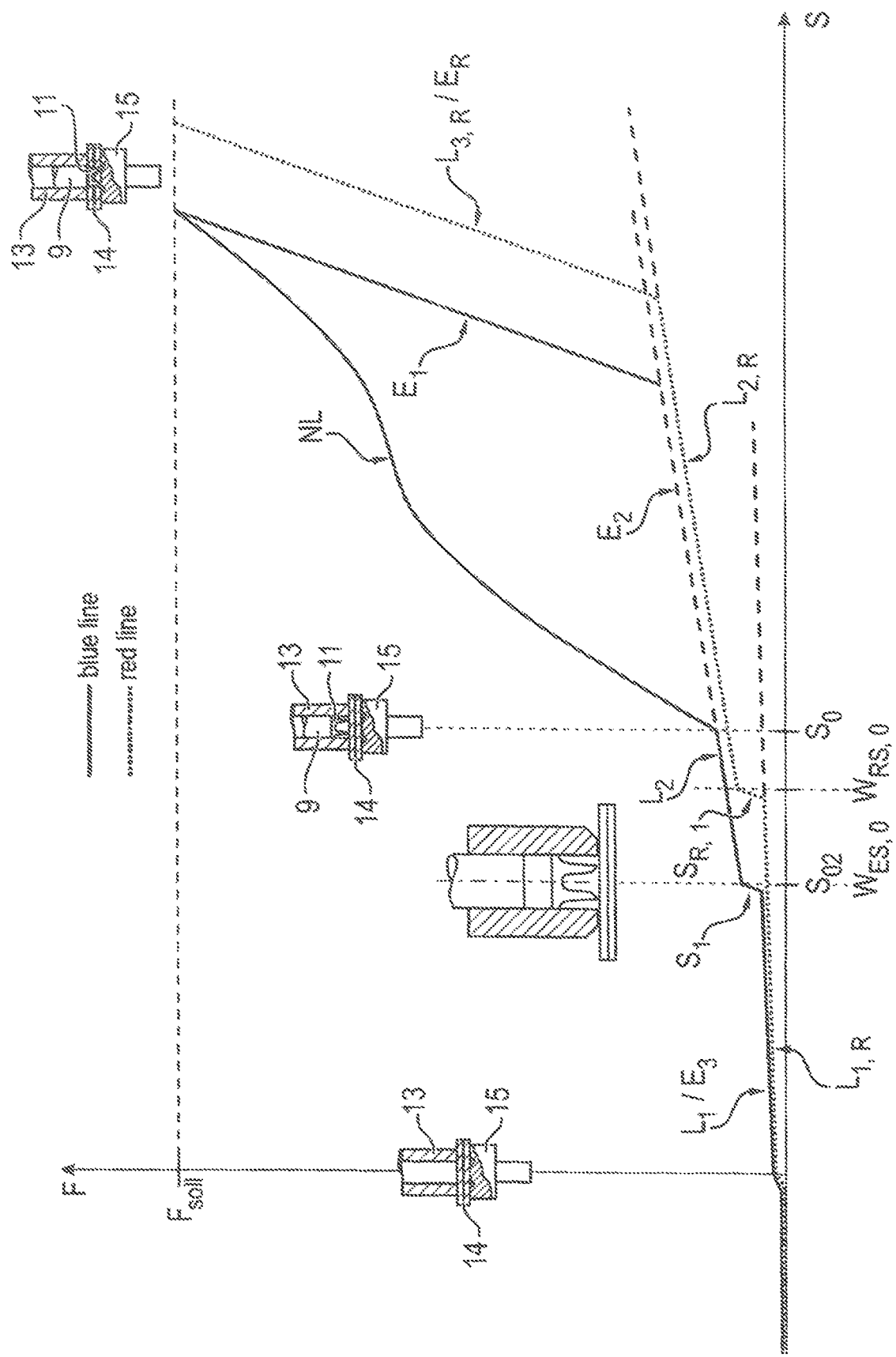
Figure 3:
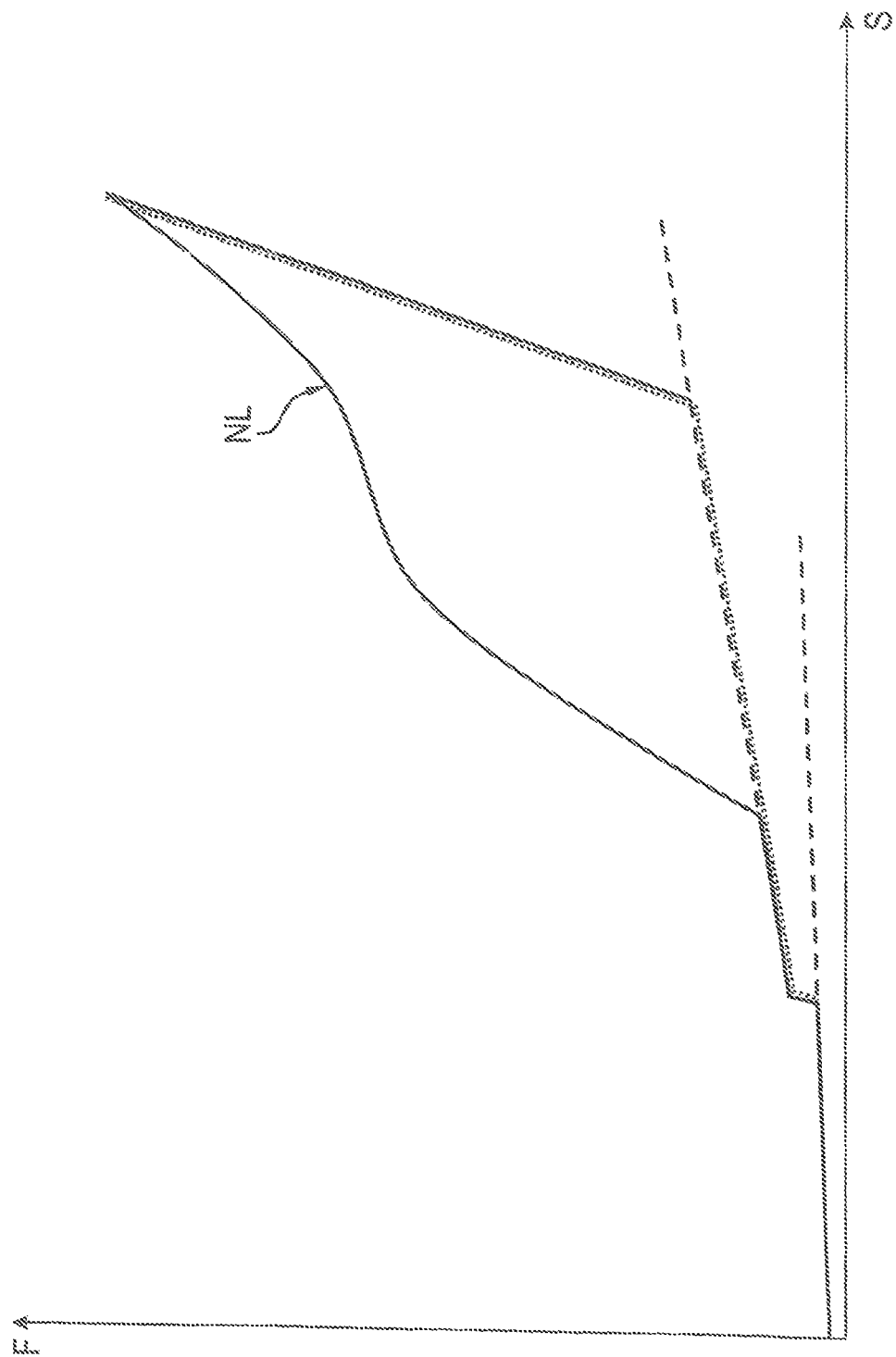
Figure 4:
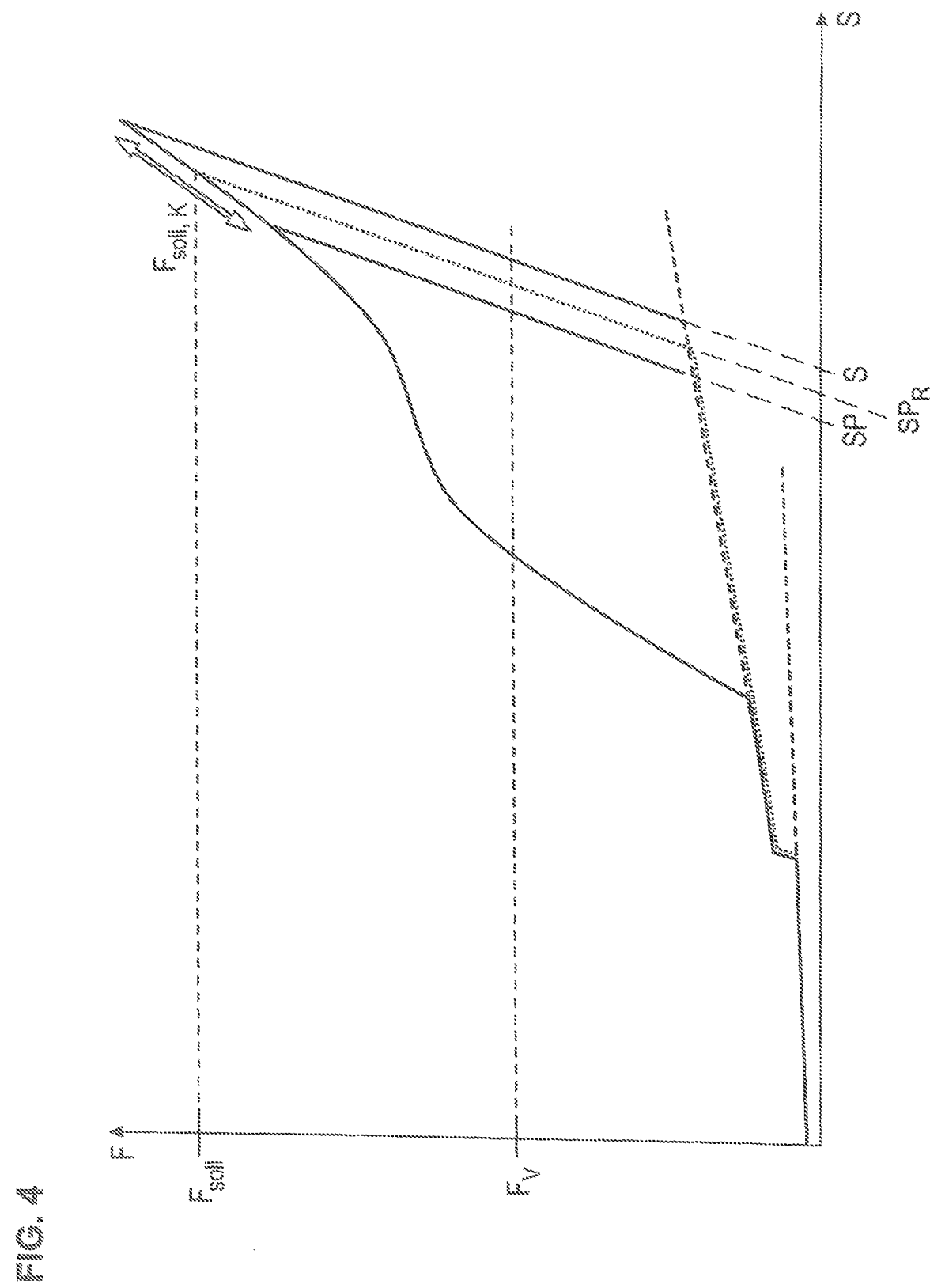
Figure 5:
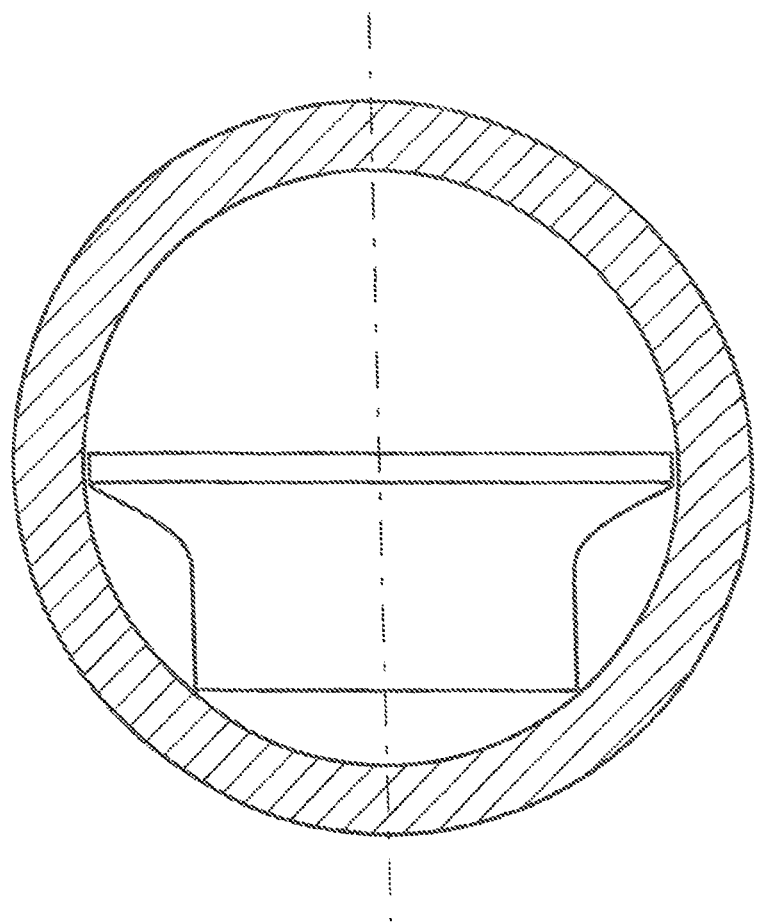
Figure 6A:
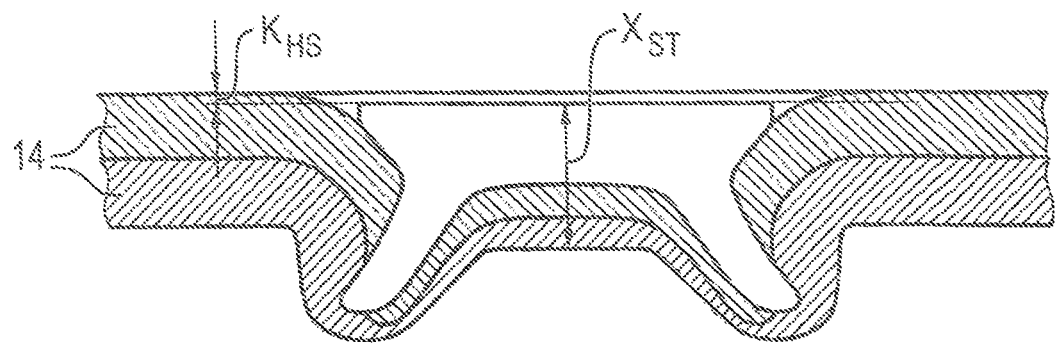
Figure 6B:
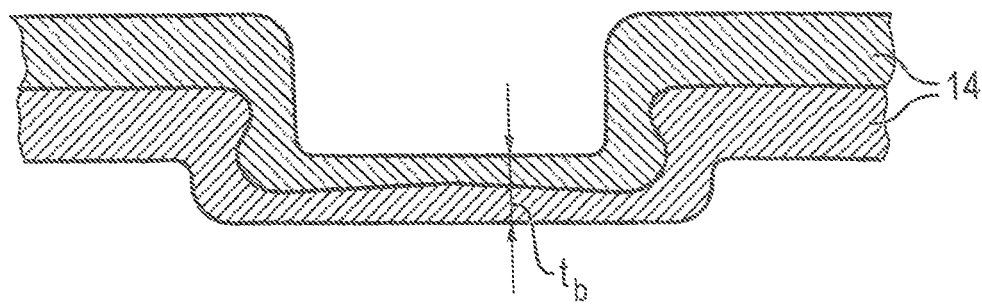
Figure 6C:
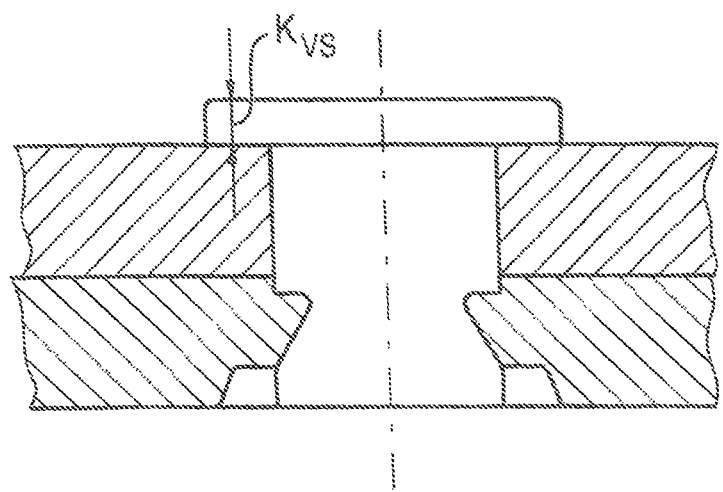

Representative embodiments of the present disclosure are explained in greater detail with reference to the accompanying drawings. These show in:

FIG. 1A is a sectional view of an embodiment of a joining device from the prior art, which is described in DE 100 21 781 B4 and the design and manner of function of which is referenced herewith, FIG. 1B is a sectional enlargement from the sectional view in FIG. 1A, FIG. 2 is a force/displacement curve (blue) and a reference force/displacement curve (red) compared, FIG. 3 the curves according to FIG. 2, wherein these are superimposed based on the step for evaluation, FIG. 4 is a schematic view for interpreting the head end position and remaining bottom thickness and for correcting the force setpoint value, FIG. 5 is a schematic view of a punch rivet turned in the joining channel, and FIGS. 6a, 6b and 6c are schematic views (6a) of the head end position of a semi-hollow punch rivet, (6b) the remaining bottom thickness of a clinch joint and (6c) the head projection of a solid punch rivet with head contact.

5. DETAILED DESCRIPTION

The control method for joining a plurality of metal sheets by means of a joining device and the method for determining the quality of such a joint were developed for joining devices as are known from the prior art. The design and manner of function for such a joining device is described, for example, in DE 100 21 781 B4, the content of which is incorporated in this context by reference. FIGS. 1A and 1B show the referenced joining device as a preferred embodiment of a joining device for the use of the present disclosure.

The basic structure of the joining device F comprises a drive element 1 which is powered here via a toggle joint. As an alternative to this, according to further embodiments a hydraulic piston-cylinder drive or an electromotive spindle drive and a pneumatic piston-cylinder drive can be used. The drive used moves the drive element 1 which moves a punch 9 and a hold-down device 13 via a linear movement in the direction of a plurality of metal sheets 14 or away from them. Thus the drive element 1 produces a controlled linear movement of the punch 9 and hold-down device 13 in a known way parallel to the mating direction $R_F$. The hold-down device 13 is preferably able to be mechanically pretensioned against the plurality of metal sheets 14 via at least one first spring 7 and one second spring 6. During the joining process for joining the plurality of metal sheets 14, the plurality of metal sheets 14 is supported on a counter-support 15. As part of a clinch process, this counter-support 15 is constituted by a correspondingly shaped die which supports the deep-drawing process. When punch riveting a semi-hollow punch rivet or a solid punch rivet, the counter-support also consists of a die which supports the formation of a closing head. An anvil may be used as a counter-support during the determination of the reference force/displacement curve.

According to the disclosure, the movement of the drive element 1 is preferably recorded by a travel sensor (not shown). The recorded travel sensor data is transmitted to a microcontroller or industrial computer for monitoring and controlling the joining device F and is processed further there. The force transferred by the drive element 1 to the elements upstream in the mating direction $R_F$—the hold-down device 13, springs 6, 7 and punch 9—is recorded by means of a force sensor (not shown). Such force sensors are known in their type of construction and arrangement in a joining device. The recorded force sensor data is transmitted to the microcontroller or industrial computer for monitoring and controlling the joining device F and is processed further there.

According to the disclosure, the first spring 7 may have a smaller spring constant compared to the second spring 6. Thus the first spring 7 is the week spring, while the second spring 6 is the strong spring. The first spring 7 is for positioning the die of the hold-down device 13 in an initial position. Accordingly, the force of spring 7 guides the hold-down device 13 back to its initial position after the joining process is ended and the joining device F is lifted from the metal sheets 14. To implement this function, the spring 7 may be mechanically pretensioned between the upper side of the hold-down device sleeve $13_H$ and the interior upper side of the drive element 1.

The second spring 6 is for applying a retaining force to the metal sheets 14. The retaining force may be set by pre-tensioning the second spring 6 between the interior upper side of the drive element 1 and a stop 16. According to a further embodiment, the stop 16 is able to be displaced with the aid of an axially displaceable threaded sleeve 17 in or opposite to the mating direction $F_R$ for this purpose, which relieves the second spring 6 or compresses it.

The drive element 1 is now moved in the mating direction and in the process the displacement W of the drive element 1 and the force F applied by the drive element 1 to the hold-down device 13 and the punch 9 are recorded. The recorded displacement S and the recorded force F are able to be represented in the force/displacement diagram, as is the case, for example, in FIGS. 2, 3 and 4. If the drive element 1 moves in the mating direction $R_F$ and has not yet contacted the metal sheets 14, the force F is almost zero. As soon as the die of the hold-down device 13 is placed onto the metal sheets 14, the recorded force jumps to the value of the pre-set pretension of the first spring 7. If the drive element 1 moves further in the mating direction $R_F$ after placement onto the metal sheets 14, the first spring 7 is compressed further via a displacement $S_F$ (see FIG. 1B) adjustable in its length until a shoulder $13_S$ of the hold-down device 13 abuts the stop 16. In the force/displacement diagram, this can be recognized by a first step based on a first linear increase $L_1$ of the force/displacement curve. The first step was offset to the point of origin in FIGS. 2 to 4 according to a further embodiment of the present disclosure, i.e. to displacement S=0. Therefore the force/displacement curve also does not begin with the force at zero but rather with the pre-tension force stored in the spring 7. This offset/displacement is represented in FIG. 2, in which the force/displacement curve continues in the range of the negative displacement axis (the x-axis; see the red and blue curves).

With the shoulder $13_S$ abutting the stop 16, a further movement of the drive element 1 in the mating direction $R_F$ now compresses the second spring 6 in combination with the first spring 7. The hold-down device 13 correspondingly applies at least the pretension preset in the second spring 6 to the metal sheets 14 as a retaining force. In the force/displacement curve, the effect of the second spring 6 is recognizable by a second step $S_1$ or a second jump and a subsequent linear increasing range $L_2$.

While the drive element 1 moves in the mating direction $R_F$, the aforementioned distance $S_F$ is covered until the hold-down device 13 applies its retaining force to the metal sheets 14. While the hold-down device 13 is displaced by this pre-settable distance $S_F$ or also free space within the joining device F, the punch 9 moves coaxially in the mating direction $R_F$ within the hold-down device 13. The distance $S_S$ (see FIG. 1B) which the punch 9 covers within the hold-down device 13 until placement on the metal sheets 14 is selectively adjustable in its length within the joining device F. The distance $S_S$ is set greater than the distance $S_F$ to be covered by the hold-down device 13 to bridge the free space. The difference in length $U_L$ between $S_S$ and $S_F$, i.e. $S_S - S_F = U_L > 0$, is thus a configurable parameter of the joining device F and therefore a known parameter. The difference in length $U_L$ ensures first of all that the hold-down device 13 is placed onto the metal sheets 14 and applies its full retaining force by means of the springs 6, 7 to the metal sheets before the punch 9 itself or a punch rivet moved by the punch 9 in the mating direction $R_F$ acts upon the metal sheets 14 with a force. Only when the punch 9 or a punch rivet moved by the punch 9 in the mating direction $R_F$ acts upon the metal sheets 14 with a force does the joining process begin, which is recognizable in the recorded force/displacement curve or in the force/displacement curve respectively by a non-linear section NL.

While the aforementioned methods are generally applicable to joining devices, they will be described based on the penetration of a punch rivet into the plurality of metal sheets. Therefore the joining device F of FIGS. 1A and 1B also shows as an example a rivet feeder 12 which has fed a punch rivet 11, in particular a semi-hollow rivet or solid punch rivet, under the punch 9. In an analogously performable clinch process, the punch 9 would perform a deep-drawing process in a correspondingly adapted die 15 to join the plurality of metal sheets 14 to one another.

Similar suitable joining devices are described in EP 1 294 505 B1, U.S. Pat. No. 4,365,401, DE 100 31 073 A1 and DE 10 2004 015 568 A1; reference is made herein to their designs.

FIG. 2 shows two curves in a force/displacement diagram. The solid line (blue here) describes the penetration or placement of a punch rivet with the joining device F described above. The springs 6, 7 are mechanically pre-tensioned for this. The drive element 1 is moved by controlled force from its initial position in the mating direction $R_F$ up to a specified force setpoint value $F_{soll}$ and then moved back opposite the mating direction $R_F$ to its initial position. During this controlled movement of the drive element 1, which is based on the specification of correctable force setpoint values $F_{soll}$ and uses no controller or real-time control, the distance S covered by the drive element 1 and the force F applied by the drive element 1 are recorded and processed.

The solid force/displacement curve of a joining process may comprise a first linear increase range $L_1$, a second linear increase range $L_2$ following thereupon, a non-linear increase range NL following thereupon and a first linear relief range $E_1$ with a first negative slope and a second linear relief range $E_2$ with a second negative slope. The first negative slope is absolutely greater than the second negative slope, so that the first relief range $E_1$ decreases more sharply than the second relief range $E_2$. Moreover, the second relief range $E_2$ may run antiparallel to the increase range $L_2$ and then also transitions and runs antiparallel to the increase range $L_1$. The increase ranges $L_1$ and $L_2$ may be separated from one another by a step S. It is also preferred that the increase ranges $L_1$, $L_2$ transition directly into one another without a step S. In this case, the spring 6 of the hold-down device 13 is preferably not pre-tensioned. If, in addition to the springs 6, 7 further holding springs engage one after the other, this would be recognizable based on further linear increase ranges L in the force/displacement curve of the drive element 1. The respective increase of a linear increase range L may be determined by the spring constant of the spring currently being compressed.

Before the weak spring 7 is compressed, despite the movement of the drive element 1 in the mating direction $R_F$, the recorded force is equal to zero or nearly zero within the range of fluctuations to be tolerated. In order to interpret the recorded force/displacement curve with greater ease and be able to be evaluated in combination with a reference force/displacement curve, a starting point of the first linear increase range $L_1$ may be set at the displacement zero point in the force/displacement diagram, as shown in FIG. 2. The same may be applicable to the reference force/displacement curve discussed below. The recorded force/displacement data are preferably evaluated for this purpose in the industrial computer with respect to the beginning of the increase range $L_1$. After this has been recognized using mathematical criteria, the recorded force/displacement curve and the reference force/displacement curve are offset to negative displacement values in such a way that the rise of the increase range $L_1$ begins at the displacement value equal to zero.

In the same way, it is alternatively possible to offset the beginning of the second linear increase range $L_2$ to negative displacement values until the rise of the increase range $L_2$ begins at the displacement value equal to zero. In this way, the influence of possible errors in the determination of measured values or generally in the force/displacement phase $L_1$ is reduced.

The second linear increase range $L_2$ transitions to the non-linear increase range NL. At the cited transition point between the range $L_1$ and the range NL the punch rivet, in particular a solid punch rivet or a semi-hollow punch rivet with or without a head, or a punch in the clinch process or another joining element moved by the punch 9 rests on the plurality of metal sheets 14. Therefore if one generates the difference between the initial displacement value $S_0$ of the non-linear increase range NL bordering on the second linear increase range $L_2$ and the starting displacement value $S_{02}$ of the bordering second linear increase range $L_2$, then a length segment proportional to the length of the joining element used results from this. In order to determine the length of the joining element from this, the length segment l determined from the force/displacement curve, i.e. $l = S_0 - S_{02}$, is to be subtracted from the constant $U_L$ typical for a setting head already discussed above.

Since the joining device used works with controlled force, the drive element 1 is moved in the mating direction $R_F$ until the specified force setpoint value $F_{soll}$ is reached. Reaching the force setpoint value $F_{soll}$ means that the joining process, i.e. the joining of the plurality of metal sheets, is ended.

After reaching this force setpoint value $F_{soll}$ specified and stored in the memory area of the controlling microcontroller or industrial computer, the drive element 1 is moved back opposite to the mating direction $R_F$ to its initial position. Thus the first relief range $E_1$ results in the force/displacement curve. This makes it clear that a C-frame used with the joining device returns with this relief to its initial shape, since it was elastically bent open during the joining process. As soon as the C-frame has almost completely achieved its initial shape, the first relief range $E_1$ transitions into the second relief range $E_2$. Only the forces applied by the hold-down device still effect a slight bending open of the C-frame. These retaining forces and the associated bending open of the C-frame are considered to be negligible, so they are not considered in the evaluation. Within this relief range $E_2$ the spring 6 of the hold-down device 13 relaxes. The relief range $E_2$ transitions to the relief range $E_3$ via the step S, and in the latter range the spring 7 of the hold-down device 13 relaxes in the same manner until the drive element 1 has reached its initial position.

A reference force/displacement curve is determined in order to be able to evaluate the recorded force/displacement curve and optimize the joining process as part of the control method. This is represented in FIG. 2 as a red line. The drive element 1 is displaced in the mating direction $R_F$ for this and the punch is thus displaced against the counter-support without a plurality of metal sheets and without a joining element located between the punch and the counter-support. Based on this configuration, the reference force/displacement curve is comprised only of the contributions from the elastically deformable components of the joining device F, which transition directly into one another. These are the compressions of the holding springs 6, 7 in the linear increase ranges $L_{1,R}$ and $L_{2,R}$ and a bending open of the C-frame in the linear increase range $L_{3,R}$. After reaching the specified force setpoint value $F_{soll}$, the drive element 1 is moved back to its initial position. This relieving return movement takes place in the linear ranges $L_{3,R}$, $L_{2,R}$, $L_{1,R}$ or the reference force/displacement curve. Due to the lack of a plastic deformation when recording the reference curve, the movement of the drive element 1 in the mating direction $R_F$ and opposite thereto takes place on the same reference force/displacement curve.

The reference force/displacement curve described above is recorded as a characteristic parameter for each joining device. In order to be able to use it in the later evaluation of actual joining processes, the reference force/displacement curve is preferably first offset to negative displacement values such that the first linear increase range $L_{1,R}$ also begins its rise at the displacement value 0. As an alternative to this, it is likewise preferred that the second linear increase range $L_{2,R}$ begin its rise at the displacement value 0 (see above). If one uses this position as a reference point for all reference force/displacement curves to be evaluated, i.e. each initial point of the first linear increase range $L_1$ or of the second linear increase range $L_2$ is placed at the displacement value 0, then the force/displacement curves can be evaluated with the help of the reference force/displacement curve and the joining processes can be optimized in this way.

As already described above, the thickness of the metal sheets 14 to be joined to one another results from the distance of the step $S_1$ in the force/displacement curve and $S_{R,1}$ in the reference force/displacement curve, specifically from the difference of the values $W_{RS,0}$ and $W_{ES,0}$. To determine now whether an optimal joint has been achieved with the specified force setpoint value $F_{soll}$, the force/displacement curve and the reference force/displacement curve are preferably offset relative to one another parallel to the displacement axis in such a way that the steps $S_1$ and $S_{R,1}$ overlap. This relative offset can take place by calculation and/or graphically in the controlling microcontroller or industrial computer.

As soon the steps $S_1$, $S_{R,1}$ are made to overlap, the linear relief ranges $E_1$ of the force/displacement curve and $E_R$ of the reference force/displacement curve are able to be compared with one another and evaluated. After the setpoint value of the joining force $F_{soll}$ has been reached, the drive element 1 is relieved by moving it opposite to the mating direction $R_F$. In this first relief phase, the C-frame, which is bent open elastically, returns almost completely to its initial shape, i.e. with negligible elastic deformations from the holding springs, so that the linear relief range $E_1$ runs parallel to the linear relief range $E_R$. If this parallel trend cannot be recorded, this confirms a fault in the joining device or its sensors.

If the punch rivet is placed with a head end position $K_{HS}$ (see FIGS. 6a and c) in the preferred interval of $0 \leq K_{HS} \leq 0.5$ mm, then the linear relief range $E_1$ lies on the linear relief range $E_R$ of the reference force/displacement curve. Accordingly, the head is flush with the uppermost sheet metal layer of the plurality of metal sheets (see FIG. 6a) or with the head projection corresponding to its head height for semi-hollow or solid punch rivets with head contact (see FIG. 6c). According to a further embodiment, the upper side of the rivet head is situated at a depth of $K_{HS}$=0.1 mm or according to a further embodiment with a maximum head projection above the component or metal sheet surface of 0.1 mm (see FIG. 6a). In this manner, an optimal setting of the predefined force setpoint value $F_{soll}$ of the joining force is confirmed preferably by calculation and/or graphically. The same applies for a joining force with which the optimal remaining bottom thickness to (see FIG. 6b) is achieved.

If the actuated force setpoint value $F_{soll}$ is not sufficiently high, the punch rivet, in particular a solid punch rivet or semi-hollow punch rivet without head contact, is placed with a head projection $K_{HS}$ or the punch rivet with head contact placed with a head end position $K_{VS}$ greater than specified or a clinch joint is produced with too large a remaining bottom thickness. Accordingly, with a relief of the drive element 1, the linear relief range $E_1$ is situated displaced toward smaller displacement values in comparison to the relief range $E_R$ of the reference force/displacement curve.

If the actuated force setpoint value $F_{soll}$ is too high, the punch rivet, in particular a solid punch rivet or semi-hollow punch rivet without head contact, is pressed too deeply into the plurality of metal sheets or the punch rivet with head contact is placed with a head end position $K_{VS}$ smaller than specified or a clinch joint is produced with too small a remaining bottom thickness. Accordingly, with a relief of the drive element 1, the linear relief range $E_1$ is situated displaced toward larger displacement values in comparison to the relief range $E_R$ of the reference force/displacement curve.

A correction value is proposed in order to be able to optimize the force setpoint value $F_{soll}$ to improve the joint to be fabricated. This correction value is stored in the industrial computer as part of a characteristic map. The correction value is preferably adapted dependent on characteristic values with reference to the respective conditions of the joining process. With a punch rivet pressed in too deeply, the correction value K corrects the force setpoint value $F_{soll}$ toward smaller values, whereas with a punch rivet with a head projection or too great a head projection or too great a remaining bottom thickness, the punching force $F_{soll}$ stored is increased by means of the correction factor K. Accordingly, the joining forces $F_{soll,K}$ to be actuated then result (see FIG. 4).

A tolerance band may be defined around the relief range $E_R$ of the reference force/displacement curve. Based on this it can be determined both graphically and by calculation with which head end position or remaining bottom thickness the joining process is concluded with the specified force setpoint value $F_{soll}$. If the linear relief range $E_1$ of the determined force/displacement curve does not lie within the tolerance band, then the force setpoint value $F_{soll}$ is offset by a correction factor K according to the result of joining. Preferably the correction factor K is saved as a characteristic map. Depending on whether there is a deviation of the linear relief range $E_1$ toward smaller or larger displacement values with regard to the linear relief range $E_R$ and how large the absolute value of this deviation is, the characteristic map provides a correspondingly calibrated correction factor K. The corresponding characteristic map is preferably saved in the memory area of the industrial computer and can be accessed there.

According to a further alternative of the control program and the program for determining the quality of the joint, an intersection point SP is determined between the linear relief range $E_1$ and a straight line with a selected comparative force value $F_V$. Analogously, an intersection point $SP_R$ is generated between the linear relief range ER and the comparative force value $F_V$. It is also preferred that these intersection points be determined and compared with one another on the displacement axis, i.e. with a force value of zero. If the intersection points SP and $SP_R$ match, then the force setpoint value $F_{soll}$ is set at an optimum. In this case, the match signals a flush head end position of the punch rivet or that the predefined remaining bottom thickness has been achieved in a clinch process. If the intersection point SP is offset to smaller displacement values, then this indicates a head projection of the punch rivet or a remaining bottom thickness greater than specified in a clinch process. In this case, the force setpoint value $F_{soll}$ is increased by the at least one correction value K. If the placed punch rivet is pressed too deeply into the metal sheet layers or too small a remaining bottom thickness is achieved in the clinch process, then the force setpoint value $F_{soll}$ is reduced by the at least one correction value K.

As already explained above, the length of the joining element is determined from the difference of the initial displacement value $S_0$ of the non-linear increase range NL bordering on the second linear increase range $L_2$ and a starting displacement value $S_{02}$ of the bordering second linear increase range $L_2$.

According to the disclosure, the rivet lengths and punch rivet geometries used are saved in the memory area of the controlling industrial computer. It can be recognized based on FIG. 1 that the punch rivet 11 is fed to the joining channel below the punch 9. The joining channel, which preferably also serves as a hold-down device 13, has an inner diameter which approximately corresponds to a head diameter of the punch rivet 11 or is formed somewhat larger. Now if the punch rivet has a head diameter and a length of its rivet shaft in a ratio greater than or equal to 2:1, preferably 8:3.3 or 12:5 or 8:4, then these punch rivets 11 can misalign in the joining channel. In this case, the rivet shaft would no longer be oriented parallel to the mating direction $R_F$, but instead would be at an angle or nearly perpendicular to it, so that the punch rivet would be situated edgewise in the joining channel. As can be seen from the ratios above, a misaligned rivet is only possible with relatively short punch rivets. This is because as soon as the rivet shaft is longer than half the rivet head diameter, the diameter of the joining channel no longer permits misalignment. Short rivets of this kind have a head diameter to shaft length ratio of 8:3.5 mm or 8:4 mm. Therefore if it is recognized according to the determination above of the rivet length and the comparison with saved rivet lengths that the rivet length determined is greater than the stored maximum rivet length, this signals a misaligned rivet. The joining process in progress is then aborted accordingly.

The invention claimed is:

1. A method for determining the quality of a joint fabricated in a plurality of metal sheets by means of a joining device, said device comprising a drive element in combination with a punch which can be moved with it and a hold-down device which can be moved with it, wherein the method has the following steps:
   a. moving the drive element in a mating direction, wherein the drive element transfers the movement to the punch and, via at least one first and one second spring, to the hold-down device,
   b. recording of a force applied by the drive element with a first sensor and of a distance covered by the drive element with a second sensor during a movement of the drive element in the mating direction and opposite thereto as a recorded force/displacement curve, and,
   c. after the completion of a joining process, comparing a linear relief range in the recorded force/displacement curve with a reference curve of the joining device, which is determined as a reference force/displacement curve with the movement of the punch and the hold-down device via the drive element toward and away from a counter-support without any sheet arranged between and without a joining element, wherein the comparison ensures an evaluation of a head end position of a joining element or a remaining bottom thickness in the plurality of metal sheets, wherein
   the reference force/displacement curve and the recorded force/displacement curve each represents a deformation of the first spring of the hold-down device and a deformation of the second spring of the hold-down device in a first linear increase range and in a second linear increase range separated via a step, and the method has a further step:
   d. generating a difference of a displacement value $W_{RS,\,0}$ of the step in the reference force/displacement curve and a displacement value $W_{ES,\,0}$ of the step in the recorded force/displacement curve, which represents a thickness of the plurality of metal sheets to be joined.

2. The method according to claim 1, wherein the linear relief range, upon a match when compared to a reference relief range, identifies a specified head end position of a punch rivet during placement of the punch rivet in the plurality of metal sheets or a predefined remaining bottom thickness in a clinch process, with an arrangement of the linear relief range displaced toward smaller displacement values compared to the reference relief range, a larger head projection than specified with reference to the plurality of metal sheets or a greater remaining bottom thickness than predefined in the clinch process, and with an arrangement of the linear relief range displaced toward larger displacement values compared to the reference relief range, the joining element pressed too deeply into the plurality of metal sheets or a remaining bottom thickness smaller than predefined in the clinch process.

3. The method according to claim 1, wherein the linear relief range in the force/displacement curve extrapolated up to an intersection point with a displacement axis or a straight line to a defined force value represents a flush or specified head end position of a punch rivet during placement of the punch rivet in the plurality of metal sheets or a specified remaining bottom thickness in a clinch process if the intersection point matches a reference intersection point of a linear reference relief range extrapolated to the displacement axis or to the straight line for the defined force value, wherein
   a deviation of the intersection point from the reference intersection point R toward smaller displacement values compared to the reference relief range represents a larger head projection than specified with reference to the plurality of metal sheets or a greater remaining bottom thickness than predefined in the clinch process, and wherein
   a deviation of the intersection point from the reference intersection point displaced toward larger displacement values represents the joining element pressed too deeply into the plurality of metal sheets or a remaining bottom thickness smaller than predefined in the clinch process.

4. The method according to claim 1, with the further step of generating a difference between an initial displacement value $S_0$ of a non-linear increase range bordering on the second linear increase range and a starting displacement value $S_{02}$ of the bordering second linear increase range, which represents a length of the joining element.

5. The method according to claim 4, with the further step of
   comparing the determined length of the joining element with saved rivet lengths and
   signaling a misaligned rivet or a non-specified rivet if the determined length of the joining element is shorter than that of a minimum rivet length stored or it is longer than a maximum rivet length.

6. A control method for joining a plurality of metal sheets by means of a joining device, said device comprising a drive element in combination with a punch which can be moved with it and a hold-down device which can be moved with it, wherein the method has the following steps:
   a. specifying a maximum joining force with a force setpoint value $F_{soll}$,
   b. recording of a force applied by the drive element with a first sensor and of a distance covered by the drive element with a second sensor during a movement of the drive element in a mating direction and opposite thereto as a recorded force/displacement curve,
   c. moving the drive element in the mating direction, wherein the drive element transfers the movement to the punch and, via at least one first and one second spring, to the hold-down device until the force setpoint value $F_{soll}$ is reached, and after that moving the drive element into an initial position, d. offsetting the force setpoint value $F_{soll}$ by at least one correction value after comparing a linear relief range in the recorded force/displacement curve with a reference curve of the joining device, which is determinable as a reference force/displacement curve with the movement of the punch and the hold-down device via the drive element toward and away from a counter-support without any metal sheet arranged between and without a joining element, in order to achieve a specified head end position in a subsequent joining process during punch riveting or a predefined remaining bottom thickness in a clinch process, wherein the reference force/displacement curve and the recorded force/displacement curve each represents a deformation of the first spring of the hold-down device and a deformation of the second spring of the hold-down device in a first linear increase range and in a second linear increase range separated via a step, and the method has a further step:

generating a difference of a displacement value $W_{RS, 0}$ of the step in the reference force/displacement curve and a displacement value $W_{ES, 0}$ of the step in the recorded force/displacement curve, which represents a thickness of the plurality of metal sheets to be joined, and wherein the step of offsetting includes the step of offsetting of the force setpoint value $F_{soll}$ to a corrected force setpoint value $F_{soll,k}$ as a function of the thickness determined for the plurality of metal sheets to be joined.

7. The control method according to claim 6 with the further step of generating a difference between an initial displacement value $S_0$ of a non-linear increase range bordering on the second linear increase range and a starting displacement value $S_{02}$ of the bordering second linear increase range, which represents a length of the joining element, comparing the determined length of the joining element with saved rivet lengths and aborting the joining process if the determined length of the joining element is shorter than that of a minimum rivet length stored or it is longer than a maximum rivet length.

8. The control method according to claim 6, wherein the linear relief range in the force/displacement curve is extrapolated up to an intersection point SP with a displacement axis or to a straight line at a defined force value and the step of offsetting includes the further step of maintaining the force setpoint value $F_{soll}$ if the intersection point matches a reference intersection point of a linear reference relief range extrapolated to the displacement axis or to the straight line at the defined force value and, thus, indicates the flush or specified head end position or the predefined remaining bottom thickness, increasing the force setpoint value $F_{soll}$ by the at least one correction value if a deviation of the intersection point from the reference intersection point toward smaller displacement values indicates a greater head projection than specified or a larger remaining bottom thickness than specified in the clinch process, and reducing the force setpoint value $F_{soll}$ by the at least one correction value if a deviation of the intersection point from the reference intersection point toward larger displacement values indicates a head of a punch rivet pressed too deeply into the plurality of metal sheets or a remaining bottom thickness smaller than specified in the clinch process.

9. The control method according to claim 8, with the further step of generating a difference between an initial displacement value $S_0$ of a non-linear increase range bordering on the second linear increase range and a starting displacement value $S_{02}$ of the bordering second linear increase range, which represents a length of the joining element, comparing the determined length of the joining element with saved rivet lengths and aborting the joining process if the determined length of the joining element is shorter than that of a minimum rivet length stored or it is longer than a maximum rivet length.

10. The control method according to claim 6, which further includes maintaining the force setpoint value $F_{soll}$ if the linear relief range matches a reference relief range, increasing the force setpoint value $F_{soll}$ by the at least one correction value if the linear relief range is displaced toward smaller displacement values compared to the reference relief range, and reducing the force setpoint value $F_{soll}$ by the at least one correction value if the linear relief range is displaced toward larger displacement values compared to the reference relief range.

11. The control method according to claim 10, wherein the linear relief range in the force/displacement curve is extrapolated up to an intersection point SP with a displacement axis or to a straight line at a defined force value and the step of maintaining includes the step of maintaining the force setpoint value $F_{soll}$ if the intersection point matches a reference intersection point of the linear reference relief range extrapolated to the displacement axis or to the straight line at the defined force value and, thus, indicates the flush or specified head end position or the predefined remaining bottom thickness, wherein the step of increasing includes the step of increasing the force setpoint value $F_{soll}$ by the at least one correction value if a deviation of the intersection point from the reference intersection point toward smaller displacement values indicates a greater head projection than specified or a larger remaining bottom thickness than specified in the clinch process, and wherein the step of reducing includes the step of reducing the force setpoint value $F_{soll}$ by the at least one correction value if a deviation of the intersection point from the reference intersection point toward larger displacement values indicates a head of a punch rivet pressed too deeply into the plurality of metal sheets or a remaining bottom thickness smaller than specified in the clinch process.

12. The control method according to claim 10, with the further step of generating a difference between an initial displacement value $S_0$ of a non-linear increase range bordering on the second linear increase range and a starting displacement value $S_{02}$ of the bordering second linear increase range, which represents a length of the joining element, comparing the determined length of the joining element with saved rivet lengths and aborting the joining process if the determined length of the joining element is shorter than that of a minimum rivet length stored or it is longer than a maximum rivet length.

* * * * *